United States Patent [19]

Cornillier et al.

[11] Patent Number: 4,932,701
[45] Date of Patent: Jun. 12, 1990

[54] HANDLING ASSEMBLY INCORPORATING SUCTION CUPS

[75] Inventors: Jean-Claude Cornillier, Margny les Compiegne; André Cayol, Thourotte, both of France

[73] Assignee: Societe Anonyme: Adler S.A., Pantin, France

[21] Appl. No.: 320,508

[22] Filed: Mar. 8, 1989

[30] Foreign Application Priority Data

Mar. 17, 1988 [FR] France .................. 88 03469

[51] Int. Cl.⁵ .................. B25J 15/06; B66C 1/02
[52] U.S. Cl. .................................. 294/64.1
[58] Field of Search .............. 294/64.1, 65; 248/362, 248/363; 269/21

[56] References Cited

U.S. PATENT DOCUMENTS

| | | | |
|---|---|---|---|
| 2,157,563 | 5/1939 | Pethick | 294/64.1 X |
| 2,212,755 | 8/1940 | Solomon | 294/64.1 |
| 2,287,576 | 6/1942 | Solomon | 294/64.1 |
| 2,303,393 | 12/1942 | Schmidt | 294/64.1 |
| 2,722,448 | 11/1955 | Popp et al. | 294/64.1 X |

FOREIGN PATENT DOCUMENTS

| | | | |
|---|---|---|---|
| 809338 | 7/1951 | Fed. Rep. of Germany | 294/64.1 |
| 1473119 | 3/1967 | France | 294/64.1 |
| 590234 | 1/1978 | U.S.S.R. | 294/64.1 |
| 635027 | 11/1978 | U.S.S.R. | 294/64.1 |
| 1111977 | 9/1984 | U.S.S.R. | 294/64.1 |
| 1184785 | 10/1985 | U.S.S.R. | 294/64.1 |

Primary Examiner—Johnny D. Cherry
Attorney, Agent, or Firm—Dickstein, Shapiro & Morin

[57] ABSTRACT

This invention relates to a handling assembly incorporating deformable suction cups for handling objects presenting a smooth and non-porous surface for application of the suction cups, the assembly comprising a body and at least one deformable suction cup mounted on this body and a release mechanism mounted mobile on the body; a single-piece construction control assembly molded in plastic and formed by rods in the shape of a rhombus with a pair of control zones, each connected to a suction cup, located at one set of opposite apices and a pair of control locations, each connected to a control member, located at the other set of opposite apices so that as the control member is moved by the operator, the rhombus is deformed and the suction cups are correspondingly deformed and released from the object being handled.

10 Claims, 3 Drawing Sheets

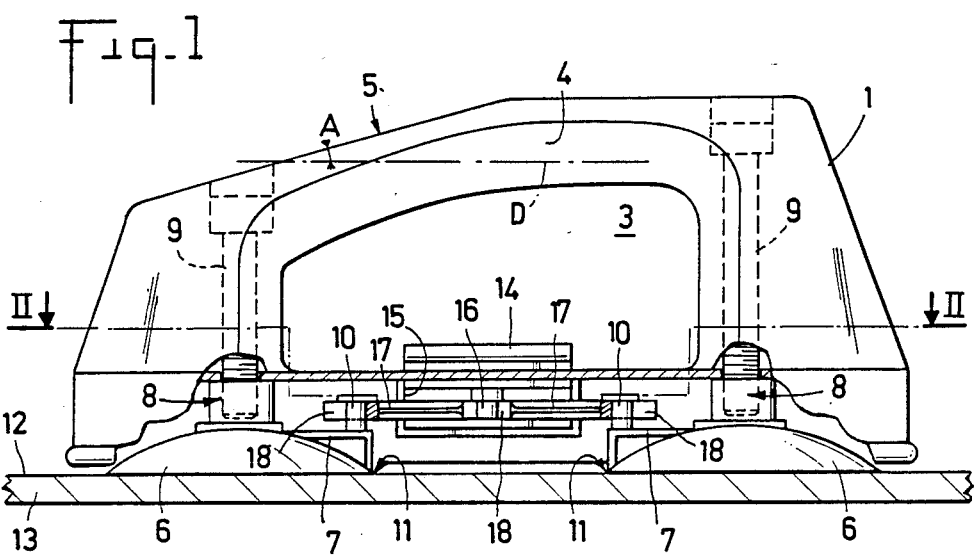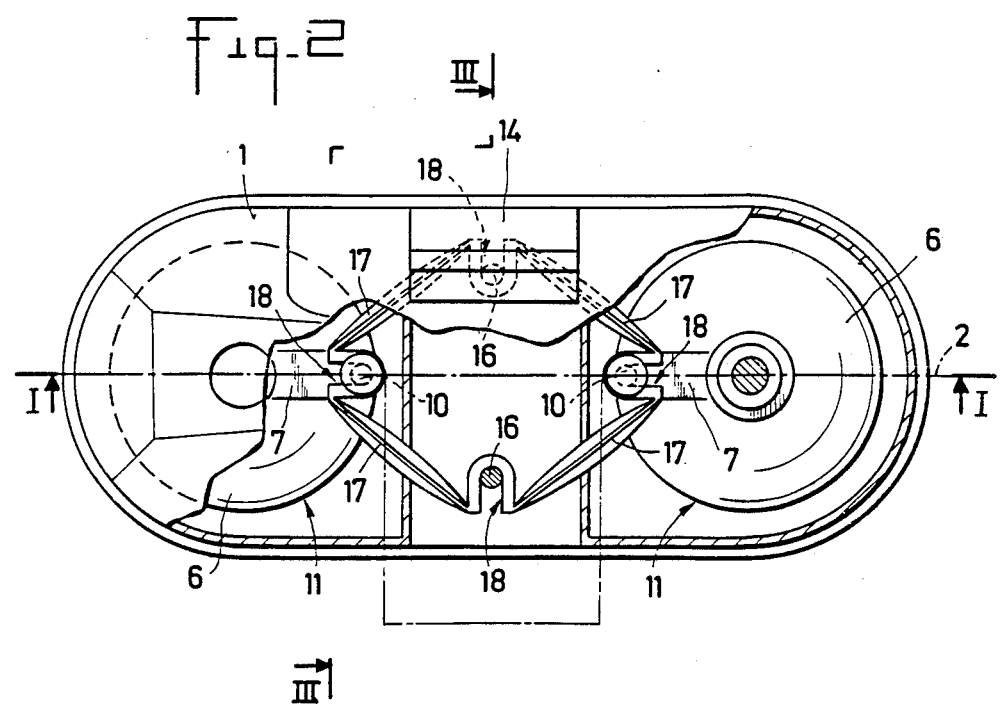

HANDLING ASSEMBLY INCORPORATING SUCTION CUPS

FIELD OF THE INVENTION

The present invention relates to handling assembly incorporating deformable suction cups for handling objects, such as plate glass, presenting a smooth and non-porous surface for application of the suction cups, said assembly comprising a body and at least one deformable suction cup mounted on this body.

BACKGROUND OF THE INVENTION

Such assemblies already exist, comprising a plurality of suction cups, generally two, of which the gripping effect is suppressed, when desired by the user, by means of a vacuum suppressing valve on the lower face of each suction cup. The heretofore existing assemblies therefore present the drawbacks of having to employ mechanical devices—valves—which are fragile and expensive, and control rod assemblies incorporating multiple connecting rods, which are likewise expensive. In addition, it is impossible to eliminate the vacuum in several suction cups in one single maneuver.

Furthermore, assemblies exist, incorporating a single suction cup, in which the gripping effect is eliminated by raising a part of the edge of the suction cup, preferably provided to that end with a lifting member, such as a lifting finger However, no such assemblies are known which comprise several suction cups and which, in addition, present a simple, reliable and inexpensive rod assembly.

It is an object of the present invention to overcome this absence of an assembly of several, but at least one, suction cups, and proposes the definition of a novel handling assembly having a one-piece, simple and resistant rod assembly

SUMMARY OF THE INVENTION

The invention therefore relates to such a handling assembly, which also comprises a mechanism for suppressing the gripping effect of the suction cups by deformation of the edge of each suction cup, itself constituted by at least one maneuvering member, such as a pusher, mounted mobile on the body; a single-piece control assembly mounted mobile on the body and with respect thereto and presenting at least as many mobile control zones as there are suction cups; as many suction cup connections as there are suction cups, connecting, each suction cup connection, one suction- cup to one of said control zones; and as many maneuvering connections as there are maneuvering members, connecting, each maneuvering connection, one maneuvering member to said control assembly.

The following advantageous arrangements are, in addition, preferably adopted:

The control assembly is constituted by a polygon of variable geometry formed by small rods, the assembly forming a single piece molded in a plastics material.

The handling assembly comprises two suction cups, while the assembly of the small rods, at rest, is shaped substantially as a one-piece rhombus and the mobile control zones are disposed substantially at two opposite apices of said rhombus.

The maneuvering connections are two in number and are disposed substantially at the other two opposite apices of said rhombus.

Each suction cup connection is constituted by at least one suction cup finger projecting from the suction cup associated therewith and engaged in a groove with which the control assembly is provided.

Each suction cup is made by molding and each suction cup finger is rendered fast with the edge of the suction cup associated therewith by fixation in said suction cup at the moment of molding thereof Each maneuvering connection is constituted by at least one maneuvering finger fast with a maneuvering member and engaged in a groove with which the control assembly is provided.

Each maneuvering is made of a molded plastics material and each maneuvering finger is made in one piece with the maneuvering member associated therewith at the moment of molding thereof.

Each maneuvering connection is fixed on a guide block mounted to slide on the body.

The body presents in its upper part a handle of which the upper face is inclined from front to rear with respect to the plane of the face of application of the suction cups.

The handling assembly comprises a plurality of suction cups which are all joined to a single one-piece control assembly, so as to allow in one maneuver the suppression of the gripping effects of the various suction cups.

The advantages of the invention reside: in the elimination of valves, which risked jamming and leaking; and in that of a rod assembly with articulated rods, which likewise presented the risk of jamming in the separation by a single action; and in the economic production obtained.

BRIEF DESCRIPTION OF THE DRAWINGS

The invention will be more readily understood on reading the following description with reference to the accompanying drawings, in which:

FIG. 1 is a longitudinal section along I—I of FIG. 2, of a first embodiment of a handling assembly according to the invention.

FIG. 2 is a partial section along II—II of FIG. 2.

DETAILED DESCRIPTION OF THE DRAWINGS

Figure 3:
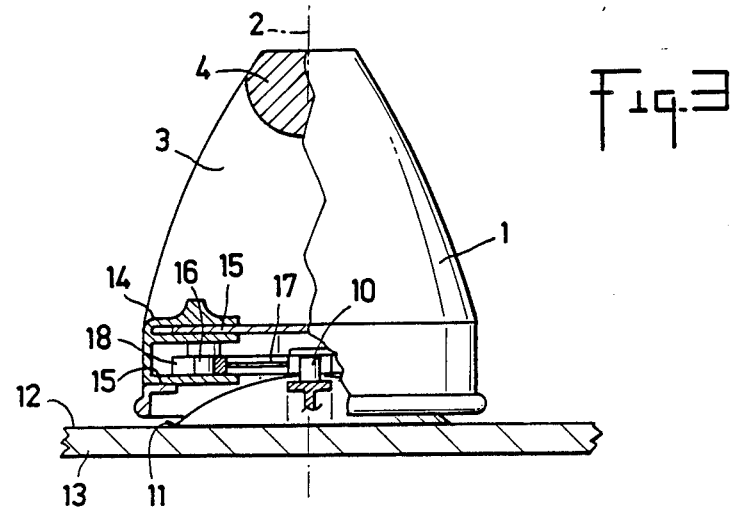
FIG. 3 is a partial section along III—III of FIG. 1.

Referring now to the drawings, the handling assembly incorporating suction cups, shown in Figs 1 to 5, is constituted by:

a body 1 symmetrical with respect to a vertical longitudinal plane 2, presenting a central recess 3 defined by a handle 4 for manipulation, the upper face 5 of the handle 4 having its rear part inclined by an angle A of about 15° with respect to the direction of a horizontal straight line D parallel to the vertical plane 2;

two suction cups 6, made of molded elastomer, provided in their upper part with a fixing and maneuvering unit 7, molded with each suction cup and comprising a central tapped bore 8 for fixing the suction cup on the body 1 by means of a screw 9 and a suction cup finger 10 more particularly attached to the edge 11 of the suction cup, the two suction cups 6 each having a plane of symmetry constituted by the vertical plane 2 and their edges 11 being contained in the same horizontal plane 12, called the plane of application of the suction cups, which merges with the non-porous, smooth face of a pane of glass 13 on which the edges 11 of the suction cups 6 are capable of being applied; the elasticity of the elastomer and the profile of abutment of the suction cups allow plate glass and convex objects to be gripped;

two pushers 14 which are disposed symmetrically on each side of the vertical plane 2, under the handle 4, which are mounted to slide horizontally and perpendicularly to the vertical plane 2 in slideways 15 made in the body 1 and which thus also constitute guide blocks, each pusher being associated with a downwardly oriented maneuvering finger 16, each maneuvering finger 16 having been made at the moment of molding the corresponding pusher 14 in a plastics material;

a one-piece assembly, made of a plastics material, such as polypropylene, of four small control rods 17, substantially forming a rhombus, with four grooves 18 disposed substantially at the four apices of the rhombus, the latter having as plane of symmetry the vertical plane 2.

At rest, when the suction cups are not applied on any surface, or when (FIGS. 1, 2 and 3), the suction cups 6 are applied on a smooth and non-porous surface 12, or at the moment (FIGS. 4 and 5) when the suction cups 6 have a part of their edge 11 deformed in order to allow suppression of the gripping effect on the glass 13, in all the configurations, the suction cup fingers 10 are and remain introduced in two of the four grooves 18, which are located in the vicinity of two opposite apices of the rhombus, and the maneuvering fingers 16 are and remain introduced in the grooves 18, which are located in the vicinity of the other two opposite apices of the rhombus, the grooves 18 being sufficiently deep to hold the suction cup fingers 10 and maneuvering fingers 16 in said grooves 18.

The pushers 14 are placed so as to be accessible and to be able to be maneuvering by a user's hand which, on holding the handle 4, more particularly presses on the upper face 5 thereof.

In order to suppress the gripping effect of the suction cups 6, the user presses on one of the pushers 14, the one disposed to the right or left of the vertical plane 2, depending on the finger of the hand used.

Figure 4:
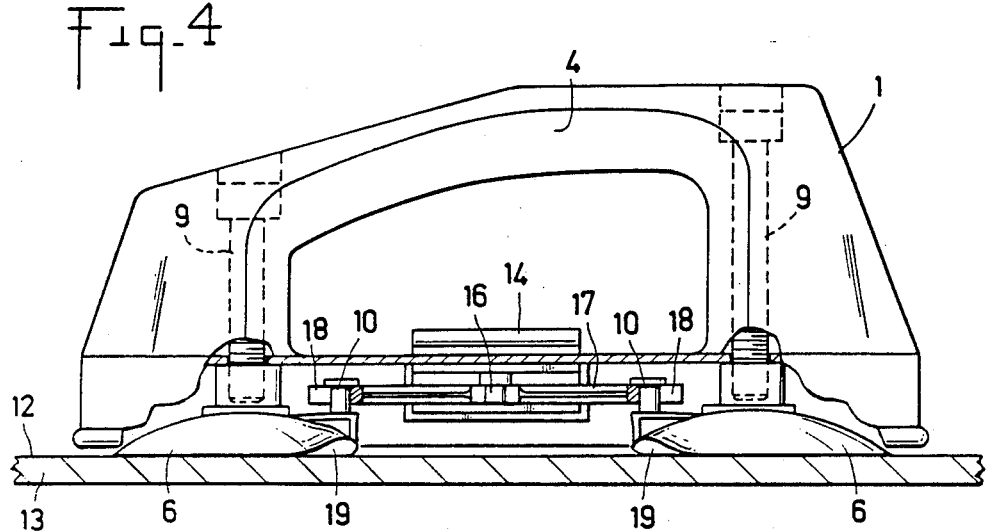
FIG. 4 is a longitudinal section similar to that of FIG. 1, of the same handling assembly, but in another configuration of service, that of the suppression of the gripping effect of the suction cups.
Figure 5:
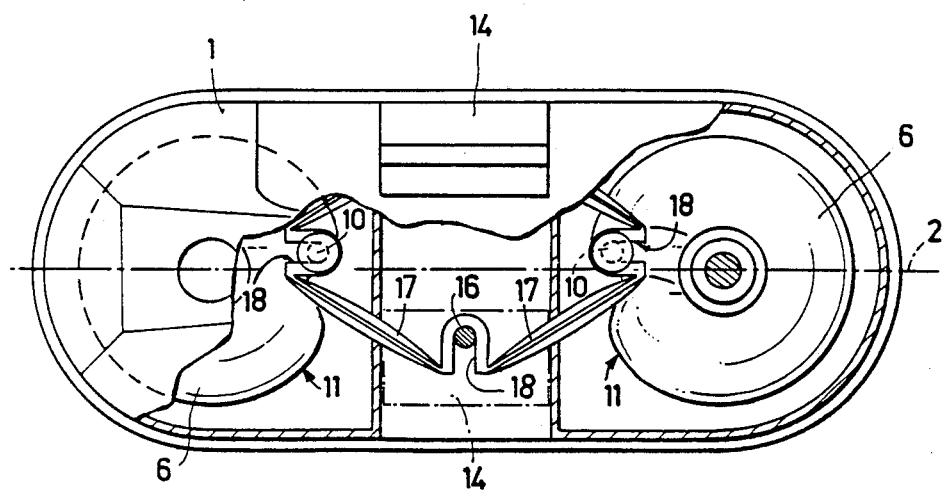
FIG. 5 is a section similar to that of Fig 2, but of the handling assembly shown in FIG. 4

The configuration of the suction cups 6 then becomes the one shown in FIGS. 4 and 5. Towards the pusher 14 which is actuated, the maneuvering finger 16 presses on the bottom of the corresponding groove 18, bringing it closer to the vertical plane 2. This thrust leads to a slight elastic deformation of the rod assembly 17 in the zone of the apices of the rhombus, and a thrust of the two suction cup fingers 10 by the corresponding grooves 18. Finally, each of the fingers 10 pulls or pushes on the edge 11 of the suction cup 6 and deforms it (elastically) until it lifts and an orifice 19 is formed for admission of air beneath the suction cup, consequently suppressing the gripping effect of the suction cup.

Figure 6:
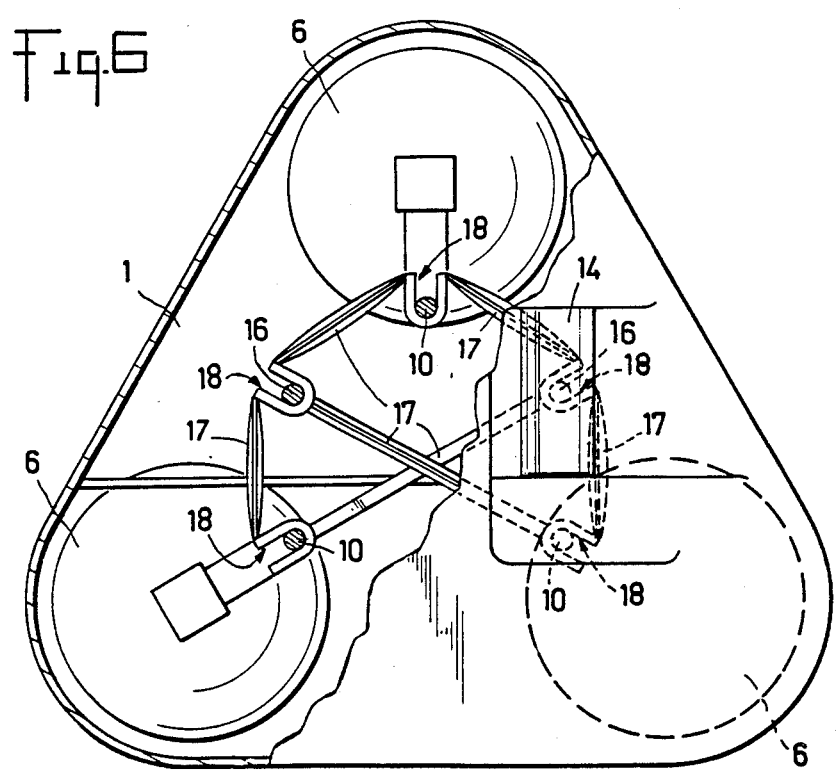
FIG. 6 is a partial section, similar to that of FIG. 2, of a second embodiment of a handling assembly according to the invention.

The embodiment of FIGS. 1 to 5 may have numerous variants within the scope of the invention, comprising in particular more than two suction cups, such as the variant of FIG. 6 comprising three suction cups 6. The same reference numbers designate the elements corresponding to those already defined with reference to FIGS. 1 to 5. The handling assembly of FIG. 6 obviously operates in the same way as that of FIGS. 1 to 5.

Operation has already been set forth, The advantages of the embodiments described are as follows:

the number of component pieces is small since the suction cup fingers 10 are not added to the suction cups 6, but are fixed at the moment of molding the suction cups, therefore forming a one-piece assembly with each suction cup;

similarly, each maneuvering finger 16 is one-piece with the corresponding pusher 14;

finally, the rod 17 and groove 18 assembly is also one-piece;

the number of separate pieces is therefore reduced and, concerning the rods 17, the risks of jamming or blockage between rods has been eliminated due to the absence of any articulation between rods and to the absence of any separate return spring, elastic return being obtained by the very elasticity of the assembly of the control rods 17 and by the elasticity of the suction cups themselves;

the choice of obtaining suppression of the gripping effect of the suction cups by deformation of the edge 11 of the suction cups 6, instead of the adoption of vacuum-suppression valves, has, in addition, made it possible to eliminate said valves and the risks of poor functioning that they might run;

the inclination of the face 5 of the handle 4 facilitates satisfactory grip of the assembly.

The embodiments described are therefore inexpensive to manufacture and to mount, and are reliable The invention is not limited to the embodiments described hereinabove, but covers all the variants which might be made thereof without departing from its scope nor spirit.

What is claimed is:

1. A handling assembly for handling objects, such as plate glass, presenting a smooth and non-porous surface, wherein said handling assembly comprises:
    a body;
    at least two coplanar deformable suction cups mounted on said body; and
    a release mechanism for suppressing the gripping effect of said suction cups by deformation of the edge of each suction cup, said release mechanism having (a) at least one control member mounted on and mobile to said body, (b) a single-piece construction control assembly molded in a plastic material and formed by rods in the shape of a polygon with at least two control zones and at least one control location positioned on said polygon, said control assembly being mounted on and mobile to said body, and each said suction cup being connected to at least one said control zone, and (c) at least one control connection, said control connection connected to said control location and connecting said control member to said control assembly such that when said control member is moved with respect to said body by the operator, said polygon shape of said control assembly is deformed with respect to said body and said suction cups are correspondingly deformed with respect to said object.

2. The handling assembly of claim 1, wherein said handling assembly comprises two suction cups, and said polygon is shaped substantially as a rhombus in its non-deformed shape and said control zones are disposed substantially at two opposite apices of said rhombus.

3. The handling assembly of claim 2, wherein the control connections and control locations are two in number and are disposed substantially at the other two opposite apices of said rhombus.

4. The handling assembly of claim 1, wherein each said rod is connected to a suction cup by a suction cup finger connected to and projecting from said suction cup and positioned within said control zone of said control assembly, said control zone consisting of a groove which firmly connects said suction cup finger to said control assembly.

5. The handling assembly of claim 4, wherein each suction cup is made by molding, and each suction cup finger is a separate piece and is connected with the edge of the suction cup associated therewith.

6. The handling assembly of claim 4, wherein each said suction cup is made by molding, and each suction cup finger is connected to the edge of the suction cup associated therewith and each suction cup and corresponding suction cup finger is molded in a single-body piece.

7. The handling assembly of claim 1, wherein each control connection consists of at least one control finger with two ends, connected at one end to a said control member and positioned at the other end within said control location of said control assembly, said control location consisting of a groove which firmly connects said control finger to said control assembly.

8. The handling assembly of claim 7, wherein each control member is made of a molded plastic material and each control finger is made in one piece with the control member associated therewith at the moment of molding.

9. The handling assembly of claim 7, wherein said control finger is fixed on a guide block mounted to slide on said body.

10. The handling assembly of claim 1, wherein said body further consists of rear and front sides, an upper face and a handle firmly connected to the said upper face of said body, said handle being inclined from said front side of said handle to said rear side of said handle with respect to the plane formed by the faces of said suction cups.

* * * * *